US010253954B2

(12) United States Patent
Garcia et al.

(10) Patent No.: US 10,253,954 B2
(45) Date of Patent: Apr. 9, 2019

(54) LONGITUDINAL STRESS MITIGATION FOR ELONGATE LED LUMINAIRES

(71) Applicant: Banner Engineering Corp., Plymouth, MN (US)

(72) Inventors: Sergio Romero Garcia, Minneapolis, MN (US); Bob Schlosser, New Hope, MN (US)

(73) Assignee: Banner Engineering Corp., Plymouth, MN (US)

( * ) Notice: Subject to any disclaimer, the term of this patent is extended or adjusted under 35 U.S.C. 154(b) by 592 days.

(21) Appl. No.: 14/876,558

(22) Filed: Nov. 16, 2015

(65) Prior Publication Data

US 2017/0138574 A1 May 18, 2017

(51) Int. Cl.
*F21K 9/27* (2016.01)
*F21V 15/04* (2006.01)
*F21V 19/00* (2006.01)
*F21V 15/015* (2006.01)
*F21Y 103/10* (2016.01)
*F21Y 115/10* (2016.01)
*B60Q 3/30* (2017.01)
*F21V 31/00* (2006.01)

(52) U.S. Cl.
CPC .............. *F21V 15/04* (2013.01); *B60Q 3/30* (2017.02); *F21K 9/27* (2016.08); *F21V 19/0085* (2013.01); *F21V 15/015* (2013.01); *F21V 31/005* (2013.01); *F21Y 2103/10* (2016.08); *F21Y 2115/10* (2016.08)

(58) Field of Classification Search
CPC . F21V 15/04; F21K 9/27; F21K 9/272; F21K 9/275
See application file for complete search history.

(56) References Cited

U.S. PATENT DOCUMENTS

| 7,052,171 | B1 * | 5/2006 | Lefebvre | ................. | F21V 21/30 |
| | | | | | 362/217.12 |
| 8,348,478 | B2 | 1/2013 | Pelton et al. | | |
| 8,933,616 | B2 | 1/2015 | Keser et al. | | |

(Continued)

FOREIGN PATENT DOCUMENTS

EP           2420437 A1    2/2012

*Primary Examiner* — William N Harris
(74) *Attorney, Agent, or Firm* — Craige Thompson; Thompson Patent Law (57) ABSTRACT

Apparatus and associated methods relate to a biased engagement relationship between an end cap and a support base slidably disposed within the elongate enclosure of a luminaire. In an illustrative example, the end cap may be in a fixed relationship to an open end of a translucent elongate enclosure that extends along a longitudinal axis. In some examples, the enclosure may house an LED light engine mounted to the support base. A spring may provide, for example, biased engagement relationship between the end cap and the support base over a predetermined range sufficient to prevent direct force transfer between the end cap and the support base over operating temperature ranges and/or vibration profiles. Some embodiments may dynamically damp vibrations of the support base within the enclosure, while providing for differential expansion and contraction of the enclosure and the support base, for example, over a wide temperature range.

9 Claims, 8 Drawing Sheets (56) References Cited

U.S. PATENT DOCUMENTS

| | | | |
|---|---|---|---|
| 2010/0181178 A1* | 7/2010 | Chang | F21V 19/008 |
| | | | 200/341 |
| 2011/0194278 A1* | 8/2011 | Yang | F21K 9/65 |
| | | | 362/217.12 |
| 2012/0106157 A1 | 5/2012 | Simon et al. | |
| 2012/0106159 A1 | 5/2012 | Simon et al. | |
| 2012/0293996 A1 | 11/2012 | Thomas et al. | |
| 2013/0336008 A1 | 12/2013 | Kim et al. | |
| 2014/0355261 A1* | 12/2014 | Dingemans | F21V 25/04 |
| | | | 362/217.17 |
| 2015/0109802 A1 | 4/2015 | Chang et al. | |
| 2015/0146418 A1* | 5/2015 | Lin | F21K 9/175 |
| | | | 362/217.13 |
| 2015/0176771 A1* | 6/2015 | Lin | F21K 9/175 |
| | | | 439/226 |
| 2015/0364886 A1* | 12/2015 | Jansen | F21V 25/04 |
| | | | 362/221 |

\* cited by examiner

LONGITUDINAL STRESS MITIGATION FOR ELONGATE LED LUMINAIRES

TECHNICAL FIELD

Various embodiments relate generally to longitudinal stress mitigation for elongate luminaires that use Light Emitting Diodes (LEDs).

BACKGROUND

A luminaire, or light fixture, may be considered a complete lighting unit that receives a replaceable bulb. A bulb, or lamp, may be designed to be easily installed and removed from a light fixture. This permits rapid exchange of bulbs from the fixture, which may be free standing or fixed. The service life of the fixture may far exceed the service life of the bulb. Accordingly, some bulbs are replaced at the end of their service life by removing the bulb from a socket formed in the fixture.

The socket may mechanically support the bulb. Depending on the bulb design, the socket may couple to the bulb mechanically in a releasable manner that does not require tools either to install or to remove the bulb from the fixture. For example, some bulbs may screw into and out of the socket. Other bulbs may mechanically couple to the bulb by orienting, rotating, and translating the bulb relative to the socket. Some light fixtures are designed for the socket to provide mechanical support and electrical signals to the bulb. In some designs, terminals on the bulb make galvanic connection to corresponding terminals of the socket when the bulb is mechanically seated or engaged in the socket.

The fixture socket must provide the mechanical and/or electrical interface according to the bulb. Bulbs are available in a variety of form factors, which vary widely according to the lighting application requirements. While a bulb can be formed in a wide variety of shapes, one shape in use is an elongated tube shape. Elongate tube shapes often have two electrical terminals located at opposing ends. This elongate tube bulb structure dictates that the luminaire have corresponding spaced apart sockets to electrically couple to the bulb's electrical terminals.

SUMMARY

Apparatus and associated methods relate to a biased engagement relationship between an end cap and a support base slidably disposed within the elongate enclosure of a luminaire. In an illustrative example, the end cap may be in a fixed relationship to an open end of a translucent elongate enclosure that extends along a longitudinal axis. In some examples, the enclosure may house an LED light engine mounted to the support base. A spring may provide, for example, biased engagement relationship between the end cap and the support base over a predetermined range sufficient to prevent direct force transfer between the end cap and the support base over operating temperature ranges and/or vibration profiles. Some embodiments may dynamically damp vibrations of the support base within the enclosure, while providing for differential expansion and contraction of the enclosure and the support base, for example, over a wide temperature range.

In one exemplary aspect, an illumination apparatus may include an elongate enclosure that extends along a longitudinal axis with a translucent body portion disposed between two opposing open ends. A support base is slidably disposed within the enclosure and extends along the longitudinal axis between the opposing open ends of the elongate enclosure. A light engine mounts to the support base and, when operated, provides illumination generated by a plurality of light emitting diodes (LEDs). The illumination passes through the translucent body portion of the elongate enclosure. The illumination apparatus includes an end cap in a fixed spatial relationship to one of the open ends of the elongate enclosure. The apparatus further includes a spring biased in a dynamic engagement relationship between the end cap and the support base.

In some embodiments, the spring maintains the dynamic biased engagement relationship when the operating temperature conditions are at a maximum rated temperature, at a minimum rated temperature, or both. The spring may include a helical coil spring or a wave spring. The apparatus may further include at least one electrical conductor that extends through the spring to make electrical connection between the light engine and externally via the end cap. The apparatus may include a spring guide member that extends and is slidable along the longitudinal axis. The spring may be at least partially supported by the spring guide member.

The spring guide member may include a distal facing end. The spring may maintain the distal end of the spring guide in substantially continuous contact with the support base while the spring is in the dynamic biased engagement relationship between the end cap and the support base. The apparatus may include an internal shoulder formed in the end cap. The spring may be biased between the interior shoulder of the end cap and an annular flange of the spring guide member.

In another exemplary aspect, a method dynamically positions an illumination apparatus to absorb differences in coefficients of thermal expansion over a temperature range. The method includes providing an elongate enclosure that extends along a longitudinal axis, where the enclosure includes a translucent body portion disposed between two opposing open ends. One step of the method includes slidably disposing a support base within the enclosure, the support base extending along the longitudinal axis between the opposing open ends of the elongate enclosure. Another step includes mounting a light engine to the support base. When the light engine is operated, the method provides illumination generated by a plurality of light emitting diodes (LEDs). The illumination passes through the translucent body portion of the elongate enclosure. Another step includes fixing an end cap in a fixed spatial relationship to one of the open ends of the elongate enclosure. The method also includes maintaining a spring in a dynamic biased engagement relationship between the end cap and the support base.

In various embodiments, the method may further include maintaining the spring in a dynamic biased engagement relationship when the operating temperature conditions are at a maximum rated temperature, at a minimum rated temperature, or both. In the method, the spring may include a helical coil spring or a wave spring.

In another exemplary aspect, an illumination apparatus includes means for generating a dynamic biased engagement relationship between the end cap and the support base over a predetermined operating temperature range.

In some embodiments, the generating means may include a spring guide member that extends and is slidable along the longitudinal axis. The generating means may further include a distal facing end. The generating means may maintain the distal end in substantially continuous contact with the support base while the generating means is in the dynamic biased engagement relationship between the end cap and the support base. The apparatus may further include an internal shoulder formed in the end cap. The generating means may be biased between the interior shoulder of the end cap and the support base.

Various embodiments may achieve one or more advantages. For example, some embodiments may dynamically compensate for differential expansion and contraction of materials over a wide temperature range. Higher reliability and improved service life may be achieved in applications in which the elongate lamp is subject to temperature variations, for example, because the internal components exhibit substantially different thermal expansion due to operating temperatures in the lamp. Some embodiments may dampen the longitudinal stress on components caused by longitudinal vibration, for example, which may extend the service life of such luminaires in vibratory applications, such as in the cargo areas of large vehicles. The mitigation of stress associated with vibration and/or thermal dimensional changes along a longitudinal axis on mechanical interfaces and electrical connections may advantageously yield cost savings by permitting a wider selection of materials for constructing the lamp, which may include a wide range of metals and alloys that may exhibit a wide range of expansion properties.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary Longitudinal Stress Mitigation Module (LSMM) for an elongate lamp is briefly introduced with reference to FIG. 1. Second, with reference to FIGS. 2A-4, the discussion turns to exemplary LSMM embodiments that illustrate construction and operational details. Specifically, features are described for mitigating longitudinal stress on lamp components due to temperature variations and/or longitudinal vibrations.

Figure 1:
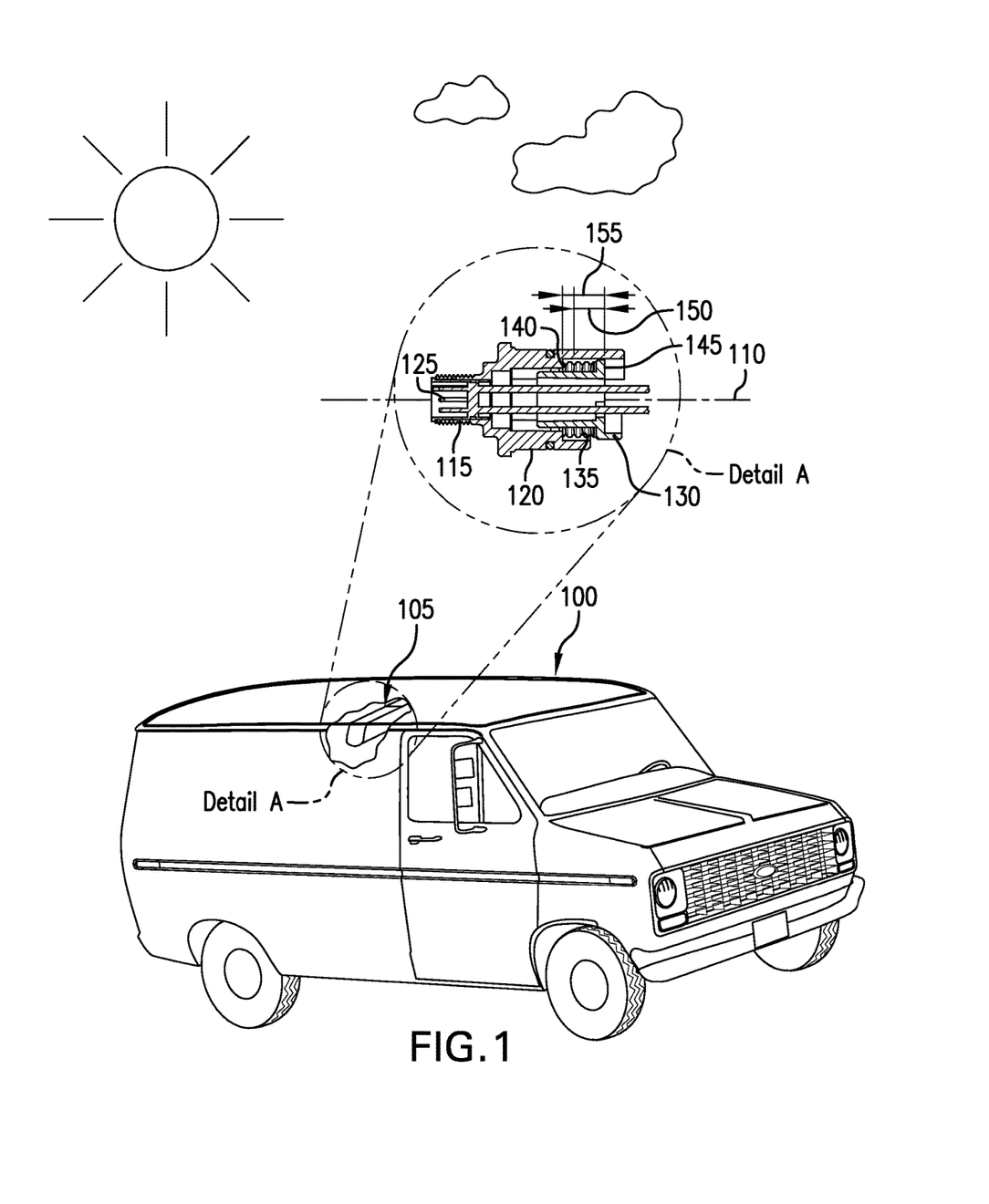
FIG. 1 depicts a diagram view of an elongate lamp with an exemplary Longitudinal Stress Mitigation Module (LSMM) in a vibratory environment and subject to a wide range of ambient temperatures.

FIG. 1 depicts a diagram view of an elongate lamp with an exemplary Longitudinal Stress Mitigation Module (LSMM) in a vibratory environment and subject to a wide range of ambient temperatures. In the depicted example, a cargo chamber 100 of a delivery truck contains an elongate light fixture including a luminaire 105 to illuminate the cargo chamber 100. Inside the enclosed cargo chamber 100, the luminaire 105 may be subjected to a wide variation of temperature conditions due to seasonal weather extremes, and significant vibration, which may be associated with, for example, driving over unsmooth surfaces. One end of the luminaire 105, depicted in detail A, includes an LSMM shown in a magnified cross-section in detail A'. In general, an LSMM operates to mitigate stresses along a longitudinal axis 110, which is aligned with a major dimension of the luminaire 105. In particular, an LSMM may advantageously substantially reduce or eliminate certain longitudinal stresses on the components of the luminaire 105, such as, for example, certain components of thermally-induced (e.g., expansion, contraction) stresses and/or vibratory stresses that may be directed along the longitudinal axis 110.

In the detail A', the end of the luminaire 105 includes a threaded socket coupler 115 on a proximal end of an end cap 120. The end cap 120 may be sealed to an elongate tubular enclosure (not shown), an example of which is described with reference to FIG. 2A. The end cap 120 includes electrical terminals 125 for making operative electrical connection to power and/or data signals, for example, when the end cap 120 is connected to a light fixture via the threaded socket coupler 115. In various embodiments, other styles of couplers (e.g., non-threaded, bayonet, twist-to-lock, etc . . . ) may be used, or omitted in favor, for example, of a pig-tail style cable extending directly from the end cap 120.

Nested inside a distal-facing interior cavity of the end cap 120 is an interposer member 130 in a biased engagement relationship with the end cap 120 via a spring 135. The interposer member 130 proximally engages a distal end of the spring 135, and distally engages a proximal end of a support member (not shown), an example of which is described with reference to FIG. 2A. Proximally, the spring 135 engages the end cap 120. In operation, the bias of the spring 135 maintains a dynamic bias engagement relationship between the end cap 120, which is rigidly fixed to an end of the elongate enclosure, and the support base, which has a proximal end that can move longitudinally relative to the end cap 120 due to, for example, mismatched coefficients of thermal expansion or contraction, and/or local temperature profiles between the translucent elongate enclosure (e.g., glass, plastic) and the support base (e.g., aluminum).

When operating within design parameters, the longitudinal displacement of the interposer member 130 may compress the spring 135 within an operating range. An extreme limit of displacement or longitudinal travel in the proximal direction is associated with the interposer member 130 fully compressing the spring 135, and bottoming out on an interior annular shoulder 140 of the end cap 120. In that extreme position, the spring 135 may be fully collapsed in compression between, proximally, the interior annular shoulder 140 and, distally, an annular flange 145 of the interposer member 130. In this case, incremental longitudinal expansion of the support member would directly transfer that force to the end cap 120, thereby inducing significant stresses on, for example, the integrity of a seal (e.g., ultrasonic weld joint) between the end cap 120 and the enclosure.

However, under proper design conditions, the interposer member 130 should preferably not bottom out; instead, the spring 135 should maintain a dynamic biasing engagement relationship within a dynamic operating range 150 that can be incrementally displaced either proximally or distally. In some embodiments, the dynamic operating range 150 may be contained within a maximum displacement range 155, i.e., the dynamic operating range 150 does not include an extreme limit of the maximum displacement range 155 at which the interposer member 130 bottoms out and cannot be further displaced without deforming the end cap 120, for example.

Figure 2A:
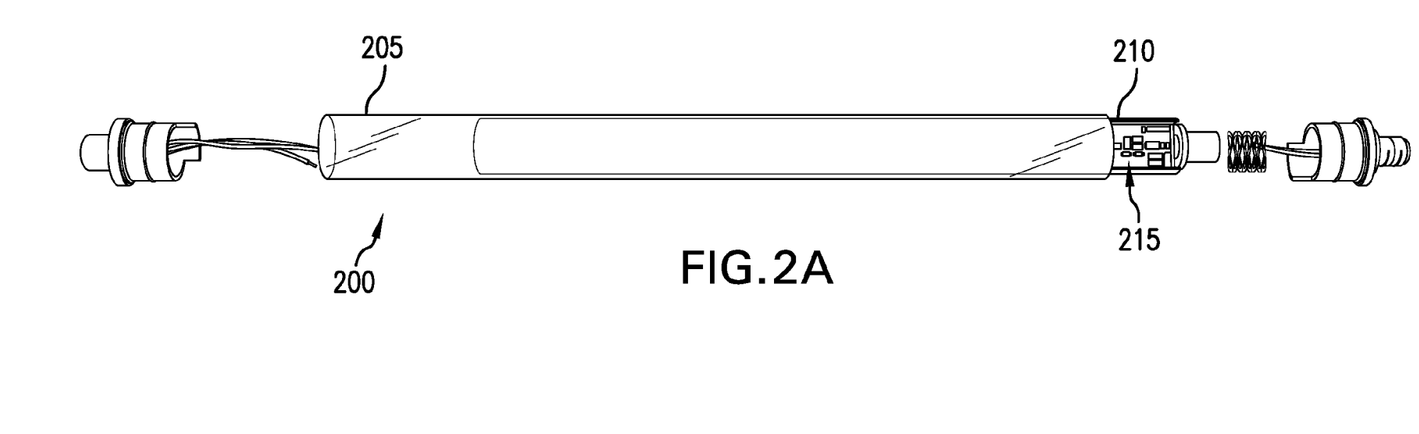
FIGS. 2A-2C depict partially exploded perspective assembly views showing construction of an exemplary LSMM in an elongate lamp.
Figure 2B:
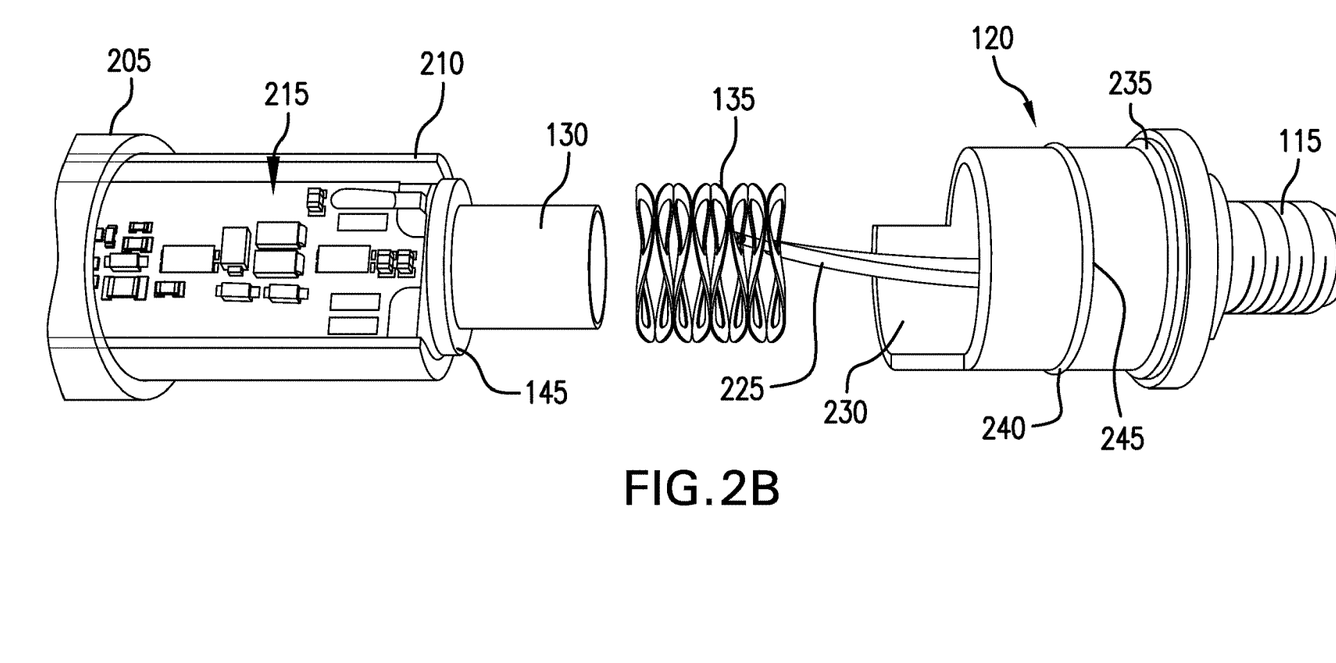
Figure 2C:
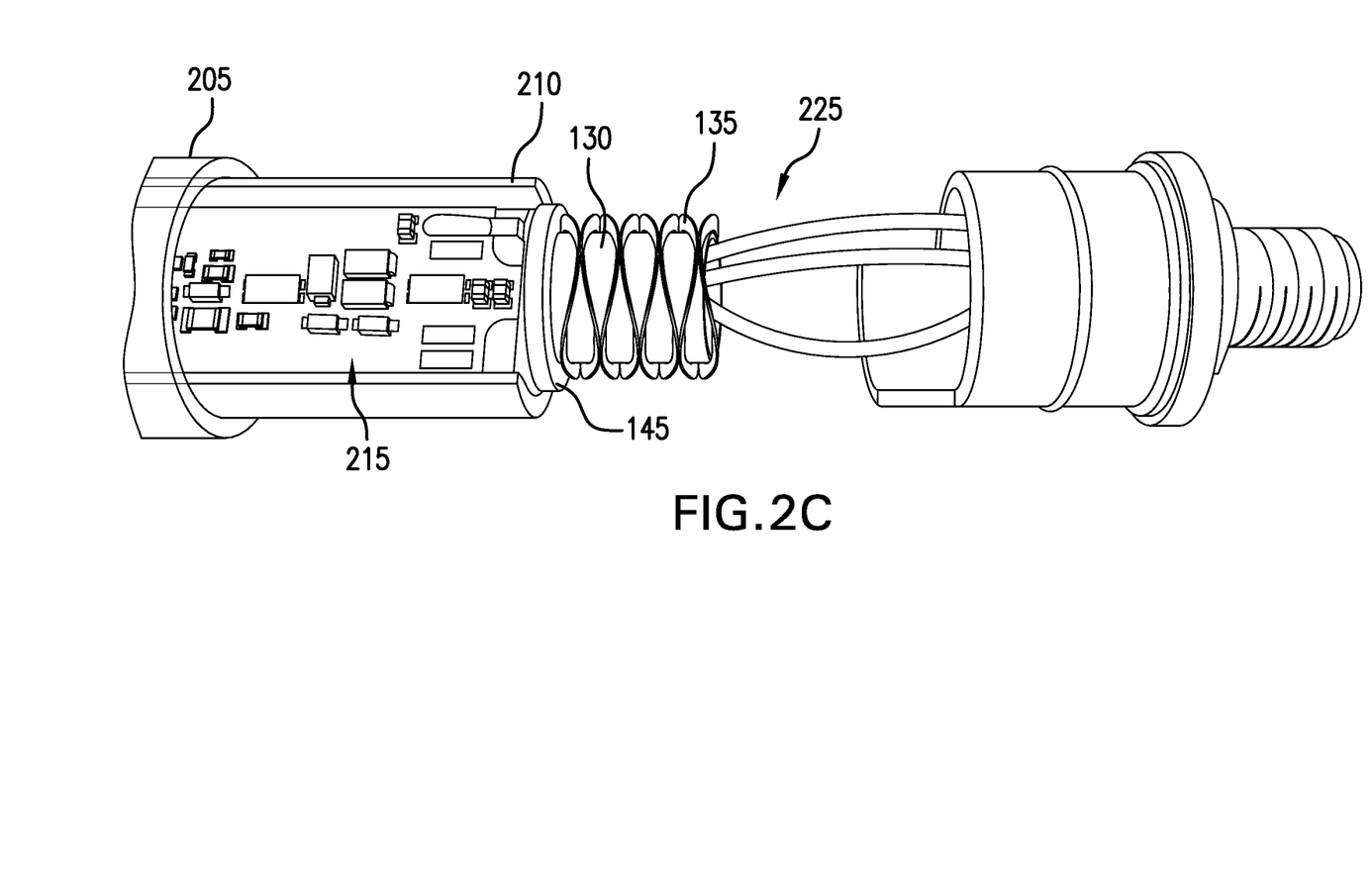

FIGS. 2A-2C depict partially exploded perspective assembly views showing construction of an exemplary LSMM in an elongate lamp. In the depicted example of FIG. 2A, a luminaire 200 includes an elongate enclosure 205 that houses a support base 210, and a light engine 215 that has circuitry and LEDs mounted on the support base 210. The support base 210 is slidably inserted into the elongate enclosure 205. Various portions of the elongate enclosure 205, or substantially an entirety of the enclosure 205, may be translucent or transparent to permit light to pass into or out of the enclosure 205.

FIGS. 2B-2C show magnified views of an end of the luminaire 200 that is capable of functioning as a LSMM when fully assembled. In particular, FIG. 2B shows that the annular flange 145 of the interposer member directly abuts the proximal end of the support base 210. As depicted, the interposer member 130 has a cylindrical body that extends proximally from the annular flange 145. In some embodiments, the cylindrical body may be of a different shape, such as square, triangle, hexagon, octagon, or an irregular shape. The interposer member 130 defines a hollow conduit through which connection to the light engine 215 may be made with wires 225. The interposer member 130 is adapted to be placed into the spring 135, such that the spring 135 seats against the annular flange 145.

The end cap 120 may be integrally formed or attached to the threaded socket coupler 115 for making electrical and mechanical connection to a light fixture, such as the light fixture for the luminaire 105 of FIG. 1. Projecting distally from the end cap 120 is a key member 230 that extends a section of the cylindrical wall. When assembled, the key member 230 occupies an annular space inside the enclosure 205 that is not occupied by the support base 210. The end cap 120 further includes a seal flange 235 to abut an end of the enclosure 205 when assembled. The depicted embodiment further includes an end cap gasket 240, which is depicted as an O-ring disposed in a corresponding annular groove 245.

FIG. 2C shows a magnified view of the end of the luminaire 200 in which the spring 135 is installed onto the interposer member 130 and seated against the annular flange 145. The wires 225 extend through the interposer member 130 and are soldered to make electrical connection to operate the light engine 215.

Figure 3A:
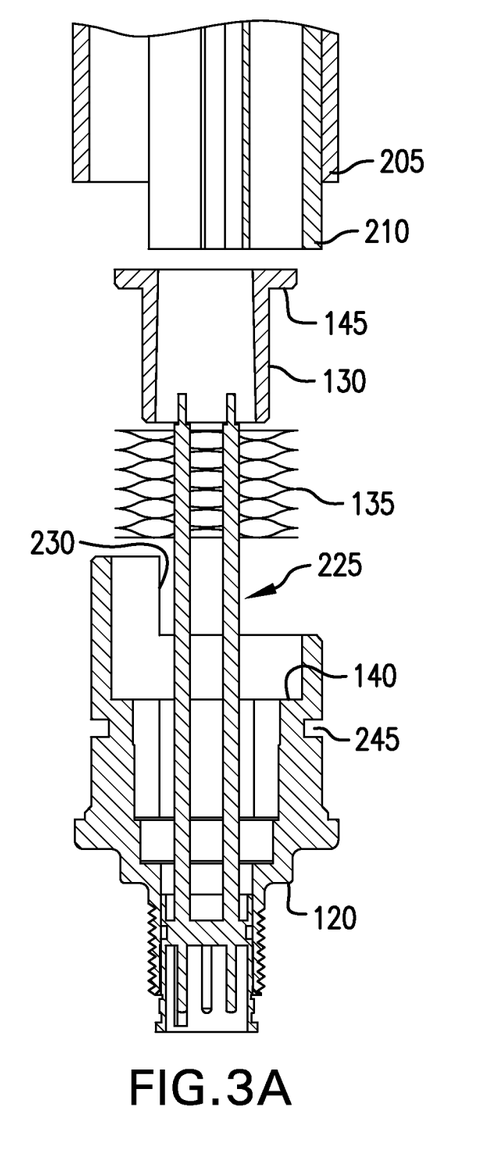
FIGS. 3A-3C depict partial cross-sectional assembly views showing construction of an exemplary LSMM.
Figure 3B:
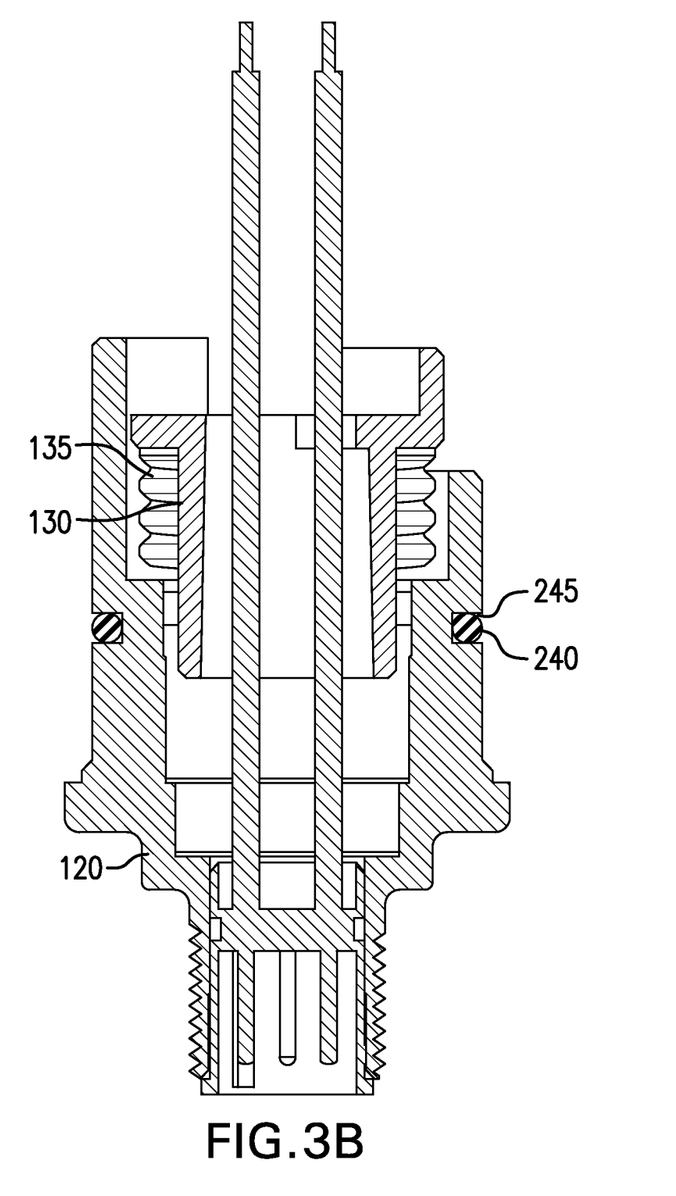
Figure 3C:
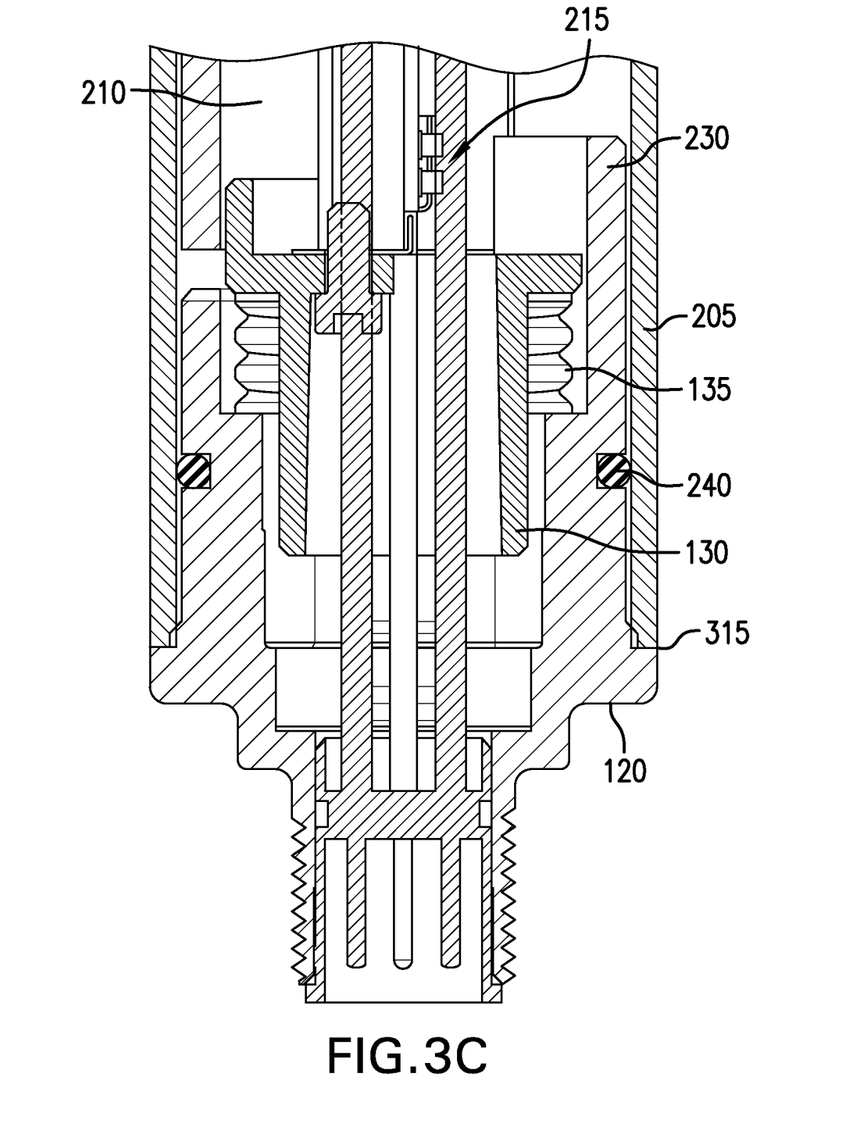

FIGS. 3A-3C depict partial cross-sectional assembly views showing construction of an exemplary LSMM. In the depicted example, FIG. 3A shows the support base 210 slidably inserted into the enclosure 205. The interposer member 130 is ready to assemble to the support base 210, and to receive the wires 225 and the spring 135 to be seated on the annular flange 145. The end cap 120 is oriented so that the key member 230 is aligned to project into the space not occupied by the support base 210. The end cap 120 is ready to receive the spring 135 to be seated against the interior annular shoulder 140, and a gasket may be installed in the annular groove 245.

FIG. 3B depicts the interposer member 130 with the spring 135 inserted into the end cap 120. The end cap gasket 240 is installed in the annular groove 245.

FIG. 3C depicts the subassembly of FIG. 3B fully installed into the enclosure 205. The interposer member 130 and the spring 135 may provide dynamic biased engaging relationship between the support base 210 and the end cap 120. The end cap 120 key member 230 extends into the enclosure 205, such that the light engine 215 is generally between the key member 230 and the support base 210. The end cap 120 is sealed to the enclosure 205 by the end cap gasket 240, and at a seal 315, which may be formed by ultrasonic welding, for example. In some implementations, a seal between the end cap 120 and the enclosure 205 may be formed by, either alone or in combination, adhesive bonds, snap fit, or laser welding, for example.

Figure 4:
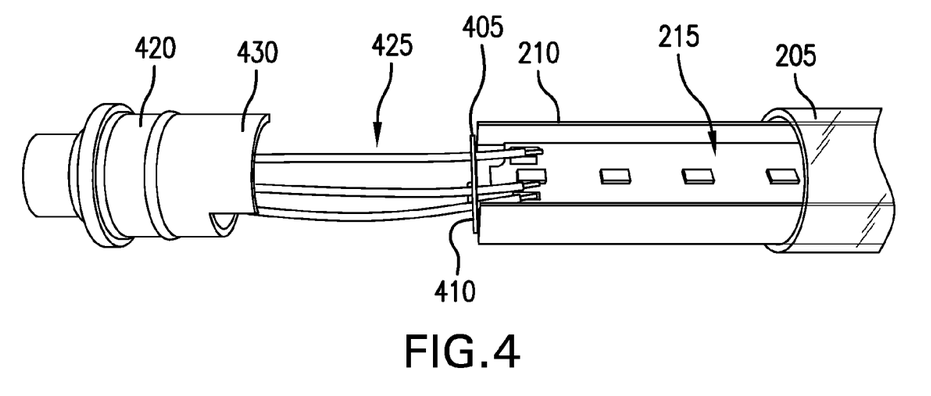
FIG. 4 depicts a partially exploded perspective assembly view showing construction of a fixed end cap at the opposite end from the exemplary LSMM in the elongate lamp of FIG. 2A.

FIG. 4 depicts a partially exploded perspective assembly view showing construction of a fixed end cap at the opposite end from the exemplary LSMM in the elongate lamp of FIG. 2A. In the depicted example, the enclosure 205 slidably contains the support base 210, and has further circuitry of the light engine 215. This end is static, in that the static end 405 of the support base 210 is maintained in a substantially fixed relationship relative to the static end cap 420. The static end cap 420 supplies wires 425 to the light engine 215 through a static end plate 410. Projecting distally from the end cap 420 is a key member 430 that extends a section of the cylindrical wall. When assembled, the key member 430 occupies an annular space inside the enclosure 205 that is not occupied by the support base 210.

Although various embodiments have been described with reference to the Figures, other embodiments are possible. For example, several biasing arrangements are possible. In some embodiments, one or more peripheral springs may be distributed around a periphery of the interposer member 130. The several springs may seat between independent points, for example, distributed around the annular flange 145, and independent points coupled to the end cap 120, such as the interior annular shoulder 140. In some examples, the interposer member 130 and/or the end cap may have cutouts, bosses or tunnels to receive and locate one or both ends of each such spring.

In some embodiments, the interposer member 130 may extend proximally from the annular flange 145 in a tapered shape (e.g., with decreasing outer diameter). Instead of a cylindrically symmetric wave spring, an arrangement of two or more leaf springs may be distributed around the end cap to provide dynamic bias engagement between the support base 210 and the end cap 120. As the support base 210 displaces the interposer member 130, the bias force may increase. In some embodiments, the leaf springs may be designed to provide a non-linear bias as a function of displacement, whereby the bias force may increase with a first derivative (e.g., dF/dx) that exceeds a linear relationship. For example, only two leaf springs may engage the interposer member 130 for small displacements. At displacements greater than a minimum threshold, the interposer member 130 may reach and be biased by additional leaf springs. Any of the springs may be individually designed to provide a non-linear bias function.

Various embodiments may be directed to a custom wave spring to absorb axial expansion differences due to a TCE (thermal coefficient of expansion) mismatch between Aluminum internal structures within a plastic tube. The wave spring may be added to at least one end cap assembly in an LED strip light or light screen. The spring may maintain continuous pressure on the internal structure that is contained in a thermoplastic tube. Over a wide temperature range, the wave spring may allow expansion or contraction without permitting over-pressure that could damage the seal (which may be, for example, water proof, or IP rated). The wave spring may further allow expansion or contraction without permitting too little pressure that might allow excessive longitudinal movement of the internal structure within the tube.

In an illustrative example, some embodiments may provide a method of accounting for the difference in thermal expansion between the inside structure and external shell of an LED light strip over a large operating temperature range. The internal metal structure that is the backbone of the device expands at a lower rate than the thermoplastic shell. Various examples may advantageously avoid large gaps to account for this expansion, which may allow the internal structure to rattle around and eventually cause fatigue on the interconnecting wires. Various embodiments may also advantageously avoid the need for thick gaskets on the ends, which have a tendency to create inconsistent pressure and over time, cause the gasket material to permanently conform to the end of the structure (damaging or loosening the gasket) and defeating the vibration protection.

Some implementations may be deployed in LED light strip applications that provide illumination. Some implementations may be retrofittable to a conventional fixture, such as a fluorescent light fixture, for example. Some embodiments may be implemented in light curtain applications. An elongate enclosure may be used to create an emitter and a receiver paired to detect intrusion of objects there between. In various embodiments, the LSMM may advantageously improve service life, especially in conditions that may experience longitudinal vibrations and/or wide operating temperature ranges.

In some embodiments, an electronic self-protection system (e.g., which may be implemented adjacent the light engine circuitry) may supplement the stress mitigation provided by the LSMM. For example, in the event that the displacement of the support base 210 relative to the end cap 120 exceeds a predetermined threshold, for example due to excess temperatures causing excess thermal expansion, a contact terminal located on the interposer member 130, for example, may make contact and complete a circuit (or break a circuit) with a terminal in the end cap 120. This circuit may generate a signal that, when received, is operative to disable or reduce power (e.g., dim) the operation of the light engine 215 in an attempt to prevent destructive overheating of the luminaire 105. In some embodiments, the self-protection circuit may trigger a timer that shuts down or trims back the power level of the light engine for a predetermined time before attempting to power up. In some examples, the reset may be delayed for a predetermined period of time to cool down, which starts when the above-described excess displacement condition is no longer being detected.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An illumination apparatus comprising:
    an elongate enclosure that extends along a longitudinal axis and comprising a translucent body portion disposed between two opposing open ends;
    a support base slidably disposed within the enclosure and extending along the longitudinal axis between the opposing open ends of the elongate enclosure;
    a light engine mounted to the support base and, when operated, providing illumination generated by a plurality of light emitting diodes (LEDs), the illumination passing through the translucent body portion of the elongate enclosure;
    an end cap in a fixed spatial relationship to one of the open ends of the elongate enclosure;
    a spring in dynamic biased engagement relationship between the end cap and the support base;
    a spring guide member that extends and is slidable along the longitudinal axis, wherein the spring is at least partially supported by the spring guide member, wherein the spring guide member further comprises a distal facing end, and the spring maintains the distal end of the spring guide in substantially continuous contact with the support base while the spring is in the dynamic biased engagement relationship between the end cap and the support base; and
    an internal shoulder formed in the end cap, wherein the spring is biased between the internal shoulder of the end cap and an annular flange of the spring guide member.

2. The apparatus of claim 1, wherein the spring maintains the dynamic biased engagement relationship when the operating temperature conditions are at a maximum rated temperature.

3. The apparatus of claim 1, wherein the spring maintains the dynamic biased engagement relationship when the operating temperature conditions are at a minimum rated temperature.

4. The apparatus of claim 3, wherein the spring maintains the dynamic biased engagement relationship when the operating temperature conditions are at a maximum rated temperature.

5. The apparatus of claim 1, wherein the spring comprises a helical coil spring.

6. The apparatus of claim 1, wherein the spring comprises a wave spring.

7. The apparatus of claim 1, further comprising at least one electrical conductor that extends through the spring to make an electrical connection between the light engine and an external fixture via the end cap.

8. An illumination apparatus comprising:
    an elongate enclosure that extends along a longitudinal axis and comprising a translucent body portion disposed between two opposing open ends;
    a support base slidably disposed within the enclosure and extending along the longitudinal axis between the opposing open ends of the elongate enclosure;
    a light engine mounted to the support base and, when operated, providing illumination generated by a plurality of light emitting diodes (LEDs), the illumination passing through the translucent body portion of the elongate enclosure;
    an end cap in a fixed spatial relationship to one of the open ends of the elongate enclosure; and
    means for generating a dynamic biased engagement relationship between the end cap and the support base over a predetermined operating temperature range, wherein the generating means comprises a spring guide member that extends and is slidable along the longitudinal axis, wherein the generating means further comprises a distal facing end, and the generating means maintains the distal end in substantially continuous contact with the support base while the generating means is in the dynamic biased engagement relationship between the end cap and the support base.

9. The apparatus of claim 8, further comprising an internal shoulder formed in the end cap, wherein the generating means is biased between the interior shoulder of the end cap and the support base.

* * * * *